United States Patent
Park et al.

(10) Patent No.: US 9,024,584 B2
(45) Date of Patent: May 5, 2015

(54) METHOD AND SYSTEM FOR SETTING SEQUENTIAL IDENTIFICATION TO MULTI-SLAVE IN BATTERY PACK

(75) Inventors: Jong-Min Park, Daejeon (KR); Young-Gwan Kim, Daejeon (KR); Hee-Sung Moon, Daejeon (KR)

(73) Assignee: LG Chem, Ltd., Seoul (KR)

(*) Notice: Subject to any disclaimer, the term of this patent is extended or adjusted under 35 U.S.C. 154(b) by 321 days.

(21) Appl. No.: 13/533,652

(22) Filed: Jun. 26, 2012

(65) Prior Publication Data

US 2012/0268069 A1    Oct. 25, 2012

Related U.S. Application Data

(63) Continuation of application No. PCT/KR2011/001931, filed on Mar. 21, 2011.

(30) Foreign Application Priority Data

Oct. 11, 2010    (KR) .................. 10-2010-0098756

(51) Int. Cl.
*H02J 7/00* (2006.01)
*H01M 10/42* (2006.01)
*H04Q 9/00* (2006.01)

(52) U.S. Cl.
CPC ......... *H02J 7/0021* (2013.01); *H01M 10/4207* (2013.01); *H01M 2010/4278* (2013.01); *H02J 2007/0098* (2013.01); *H04Q 9/00* (2013.01); *H01M 10/425* (2013.01); *H04Q 2209/10* (2013.01)

(58) Field of Classification Search
CPC ...... H02J 7/0006; H02J 7/0008; H02J 7/0021
USPC .......................................... 320/116
See application file for complete search history.

(56) References Cited

U.S. PATENT DOCUMENTS

| | | | |
|---|---|---|---|
| 6,078,165 A * | 6/2000 | Ashtiani et al. ............... | 320/116 |
| 2002/0126000 A1 | 9/2002 | Shintani et al. | |
| 2006/0020372 A1 | 1/2006 | Watabe | |
| 2007/0279953 A1* | 12/2007 | Hoff et al. ...................... | 363/87 |
| 2008/0086247 A1 | 4/2008 | Gu et al. | |
| 2009/0146610 A1* | 6/2009 | Trigiani ........................ | 320/119 |
| 2010/0019732 A1* | 1/2010 | Utsumi et al. ................ | 320/136 |
| 2010/0052428 A1 | 3/2010 | Imamura et al. | |
| 2010/0055543 A1* | 3/2010 | Tae et al. ........................ | 429/50 |

(Continued)

FOREIGN PATENT DOCUMENTS

| JP | 62-1339 A | 1/1987 |
|---|---|---|
| JP | 8-37538 A | 2/1996 |

(Continued)

OTHER PUBLICATIONS

Form PCT/ISA/210 for PCT/KR2011/001931 mailed on Oct. 31, 2011.

*Primary Examiner* — Samuel Berhanu
*Assistant Examiner* — Jerry D Robbins
(74) *Attorney, Agent, or Firm* — Birch, Stewart, Kolasch & Birch, LLP

(57) ABSTRACT

Disclosed is a method for setting sequential ID to a multi-slave BMS in a battery pack, the battery pack including N (N: natural number of 2 or more) slave BMSs having sequential physical locations to control a battery module containing at least one battery and a main BMS to control the N slave BMSs.

15 Claims, 4 Drawing Sheets

(56) References Cited

U.S. PATENT DOCUMENTS

| | | | |
|---|---|---|---|
| 2010/0182154 A1* | 7/2010 | Kawai et al. | 340/636.1 |
| 2011/0273023 A1 | 11/2011 | Nishida et al. | |

FOREIGN PATENT DOCUMENTS

| | | |
|---|---|---|
| JP | 2002-110259 A | 4/2002 |
| JP | 2004-222312 A | 8/2004 |
| JP | 2005-341386 A | 12/2005 |
| JP | 2007-235870 A | 9/2007 |
| JP | 2008-99482 A | 4/2008 |
| JP | 2010-141971 A | 6/2010 |
| KR | 10-2008-0013605 A | 2/2008 |
| KR | 10-2008-0032454 A | 4/2008 |
| KR | 10-2009-0069189 A | 6/2009 |

\* cited by examiner

| # | 1 | 2 | 3 | 4 |
|---|---|---|---|---|
| EFFECTIVE ID INFORMATION | 000001 (10) | 010100 (20) | 011110 (30) | 101000 (40) |
| CURRENT ID INFORMATION | 000001 (10) | 001010 (20) | 110000 (48) | 101000 (40) |
| EFFECTIVE/ INEFFECTIVE | EFFECTIVE | EFFECTIVE | INEFFECTIVE | EFFECTIVE |
| ID INFORMATION FOR RESETTING | | | 011110 (30) | |

METHOD AND SYSTEM FOR SETTING SEQUENTIAL IDENTIFICATION TO MULTI-SLAVE IN BATTERY PACK

CROSS-REFERENCE TO RELATED APPLICATION

This application is a continuation of International Application PCT/KR2011/001931 filed on Mar. 21, 2011, which claims priority from Korean Patent Application No. 10-2010-0098756, filed on Oct. 11, 2010, the entire disclosure of which is incorporated herein by reference for all purposes.

BACKGROUND

1. Field

The present invention relates to a method and system for setting identification (ID) to a respective slave of a multi-slave battery management system (BMS) for use with a battery pack including multiple batteries, and more particularly, to a method and system for automatically setting or allocating sequential IDs to a multi-slave BMS having a sequential physical structure.

2. Description of Related Art

Secondary batteries have high applicability depending on the product group and excellent electrical characteristics such as high energy density, and thus are commonly being used as electric power sources of electric vehicles (EVs) or hybrid vehicles (HVs) as well as mobile devices.

These secondary batteries have a primary advantage of greatly reducing the use of fossil fuels. Also, secondary batteries do not generate by-products that come with the energy consumption, and thus are environmentally friendly and can improve the energy efficiency. For these reasons, secondary batteries are gaining attention as alternative energy sources.

Generally, a battery pack for EVs includes an assembly made up of a plurality of batteries (cells) or a plurality of assemblies. The cell has a cathode current collector, a separator, an active material, an electrolyte, an aluminum thin-film layer, and the like, and can be charged and discharged by electrochemical reactions between these components or elements.

In addition to the basic structure above, the battery pack further includes a battery management system (BMS) to manage the batteries by monitoring the state of the batteries and controlling the environment of the batteries using algorithms for controlling the power supply based on a driving load of a motor, measuring the electrical properties such as current or voltage, controlling the charge/discharge, equalizing the voltage, estimating the state of charge (SOC), and the like.

Recently, there is an increasing need for a battery pack as high capacity applications as well as energy storage applications. To meet the need, a multi-module battery pack having a plurality of batteries connected in series/parallel is generally dominant.

This multi-structure battery pack may be implemented variously depending on the type of a logic circuit or printed circuit board (PCB). For example, to improve the monitoring and control efficiency, the multi-structure battery pack may comprise a multi-slave BMS including a plurality of slave BMSs to respectively manage a plurality of batteries constituting the battery pack and a main or master BMS to integratedly control a plurality of the slave BMSs.

In this instance, the main BMS communicates with the slave BMSs to collect data of the batteries managed by the slave BMSs that will be used in checking the current state of the batteries and controlling the charge/discharge of the batteries.

To collect data or transmit a command signal, a node identification (ID) of each slave BMS is necessarily required. Conventionally, an ID is preset on a circuit or programmed in an electrically erasable programmable read-only memory (EEPROM) and the like, for each slave BMS.

Since this conventional method needs mechanisms for operating individual hardware or software as many as the number of slave BMSs included in the battery pack and must manage the mechanisms, it occupies a lot of resources and has a complex operating scheme.

Also, to analyze an error, replace a certain slave BMS, control a specific battery, and the like, it is preferable that the slave BMSs have IDs set based on the physical locations of the slave BMSs.

However, conventionally a slave BMS is given a unique ID when manufacturing, irrespective of the physical location. Thus, a specific slave BMS has no other choice but to be mounted at a specific location, resulting in extremely limited range of use. When a slave BMS is mounted at a wrong location, an error in operating or controlling a system may occur.

Furthermore, when replacing a certain slave BMS, a new slave BMS having a slave board of the same ID as well as the same hardware or software version is required. Thus, a plurality of slave boards should be prepared for each ID and the software architecture should be changed whenever needed.

DISCLOSURE

The present invention is designed to solve the conventional problems above, and therefore it is an object of the present invention to provide a method and system for setting sequential identification (ID) to a multi-slave battery management system (BMS) in a battery pack, in which IDs a re-automatically set to slave BMSs based on the sequential physical locations of the slave BMSs using the same hardware or software without the need to input or program IDs in advance, thereby improving the efficiency of mass-production of products, fundamentally preventing the erroneous mounting of a slave BMS or a slave module, and consequently improving the reliability of products.

Additional features of the invention will be set forth in the description which follows, and in part will be apparent from the description, or may be learned by practice of the invention.

In order to achieve this object, provided is a method for setting sequential ID to a multi-slave BMS in a battery pack, the battery pack including N (N: natural number of 2 or more) slave BMSs having sequential physical locations to control a battery module containing at least one battery and a main BMS to control the N slave BMSs, the method including the main BMS transmitting a trigger signal to a first slave BMS to initialize ID setting, the first slave BMS receiving the trigger signal and transmitting ID information of the first slave BMS to the main BMS and the trigger signal to a next slave BMS, sequentially performing a process of receiving the trigger signal and transmitting slave BMS ID information to the main BMS and the trigger signal to a next slave BMS throughout the second slave BMS to the N-1th slave BMS, and the Nth slave BMS receiving the trigger signal and transmitting ID information of the Nth slave BMS to the main BMS.

The method may further include the main BMS transmitting an ID allocating signal to a slave BMS having not transmitted slave BMS ID information within a predetermined time to allocate new ID information, and the slave BMS setting ID information of the slave BMS in response to the ID allocating signal and transmitting the ID information of the slave BMS to the main BMS.

Here, the new ID information may correspond to the physical location of the slave BMS having not transmitted ID information in relation to the N slave BMSs.

Preferably, the method may further include the main BMS transmitting an ID resetting signal to a slave BMS having transmitted ineffective ID information to give reset ID information, and the slave BMS having transmitted ineffective ID information resetting the ID information of the slave BMS in response to the ID resetting signal. Also, the method may further include, after resetting the ineffective ID information, the slave BMS transmitting the reset ID information to the main BMS.

In this instance, at least one of the cases where ID information transmitted from a slave BMS overlaps with ID information of the other slave BMS, where the number of ID information is not equal to the total number of the slave BMSs, and where ID information transmitted from a slave BMS does not correspond to the physical location of the slave BMS or is non-sequential, may be determined as ineffective ID information. Here, the reset ID information may correspond to the physical location of the slave BMS having transmitted ineffective ID information in relation to the N slave BMSs.

Also, the method may further include, after receiving the trigger signal, a slave BMS having no ID information set thereon searching ID information of the other slave BMSs, setting ID information not allocated to the other slave BMSs as ID information of the slave BMS using the search results, and transmitting the ID information of the slave BMS to the main BMS.

According to another aspect of the present invention, provided is a system for setting sequential ID to a multi-slave BMS in a battery pack, the battery pack including N (N: natural number of 2 or more) slave BMSs having sequential physical locations to control a battery module containing at least one battery and a main BMS to control the N slave BMSs, the system including a main BMS to transmit a trigger signal to a first slave BMS to initialize ID setting, a first slave BMS to receive the trigger signal and transmit ID information of the first slave BMS to the main BMS and the trigger signal to a next slave BMS, at least one slave BMS to receive the trigger signal and sequentially performing the transmission of ID information of each slave BMS to the main BMS and the trigger signal to a next slave BMS, and an Nth slave BMS to receive the trigger signal and transmit ID information of the Nth slave BMS to the main BMS.

Also, the present invention may provide a battery pack including the system for setting sequential ID to a multi-slave BMS in a battery pack according to the present invention.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

The present invention will now be described in detail with reference to the accompanying drawings. Prior to description, it should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

Accordingly, the description proposed herein is just a preferable example for the purpose of illustrations only, not intended to limit the scope of the invention, so it will be apparent to those skilled in the art that various modifications and variation can be made in the present invention without departing from the spirit or scope of the invention.

Figure 1:
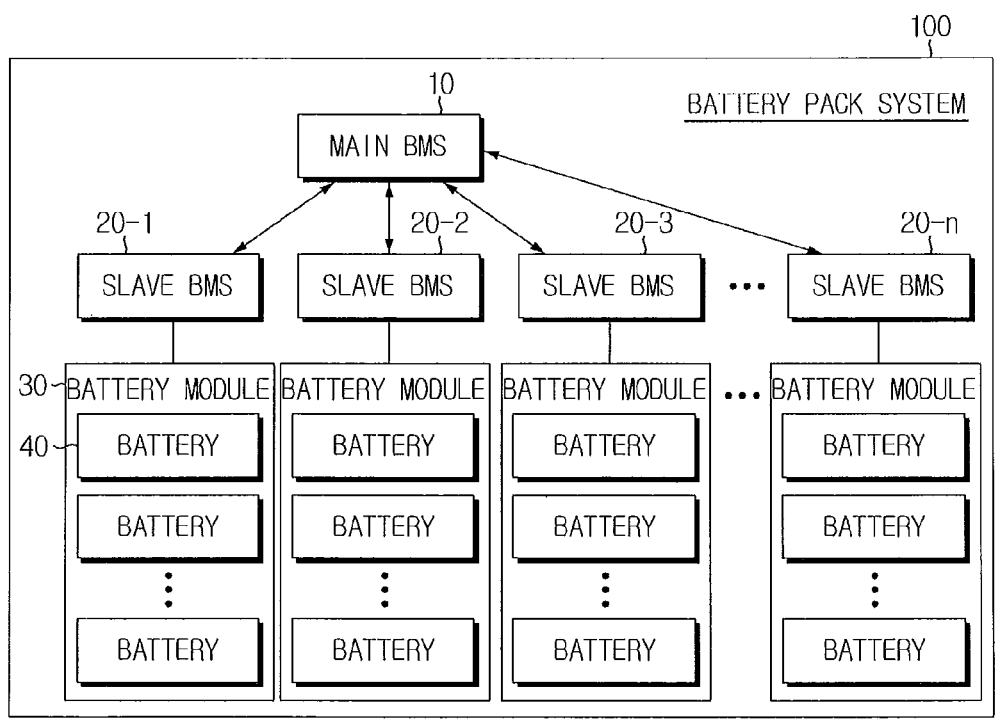
FIG. 1 is a block diagram illustrating a general structure of a multi-slave battery pack according to the present invention.

FIG. 1 is a block diagram illustrating a general structure of a multi-slave battery pack 100 according to the present invention.

Referring to FIG. 1, a multi-slave battery pack 100 according to the present invention includes a main battery management system (BMS) 10, a slave BMS 20, and a battery module 30 including at least one battery 40. The slave BMS 20 is plural and has a physically sequential structure.

The main BMS 10 integratedly controls a plurality of the slave BMSs 20, and forms a network with a plurality of the slave BMSs 20. The main BMS 10 communicates with each slave BMS 20 to request and receive necessary information.

Each slave BMS 20 is electrically connected to the corresponding battery module 30 to control the battery module 30, in particular, at least one battery 40 included in the battery module 30. As described above, the slave BMS 20 has various electrical and electronic control functions applicable by a person having ordinary skill in the art, including charge/discharge control, voltage equalization, switching, electrical property measurement and monitoring, error indication, on/off control, and the like.

As shown in FIG. 1, in the multi-slave battery pack 100 according to the present invention, a plurality (N; natural number of two or more) of the slave BMSs 20 have sequential physical locations and the main BMS 10 integratedly controls a plurality of the slave BMSs 20.

The slave BMSs 20 have IDs set based on their sequential physical locations. The reason is as follows:

For example, assume that the main BMS 10 controls ten slave BMSs 20 and each slave BMS 20 controls the battery module 30 including five batteries. When a second battery of a third slave BMS 20 is out of order, the main BMS 10 should know correct location information of the corresponding battery and perform a subsequent processing. In this instance, it is obvious that the slave BMSs 20 may control battery modules including different numbers of batteries contained in each battery module.

When a malfunction or error occurs to a specific battery as described above, to minimize the influence on the performance of the system, it is preferable to, as a subsequent processing, power off the corresponding battery or a battery module including the corresponding battery or to limit the state of charge (SOC) of the corresponding battery to about 50% under the control of the main BMS 10.

To perform this processing right, the main BMS 10 should know a correct ID of the slave BMS 20 managing the broken-down battery. Besides, it is preferable that the slave BMS 20 recognizes IDs of a plurality of the batteries 40 managed by the slave BMS 20 within the hardware resources or system environment. In this case, the slave BMS 20 alone can perform the above processing.

Additionally, it is preferable to store the malfunction or error information in a memory, so that correct data can be secured and used when an operator intends to selectively replace or repair the broken-down battery. Also, it is preferable to induce a user to take a proper immediate or preliminary action by the main BMS's transmitting location information of the corresponding battery or a slave BMS managing the corresponding battery to the user.

Figure 2:
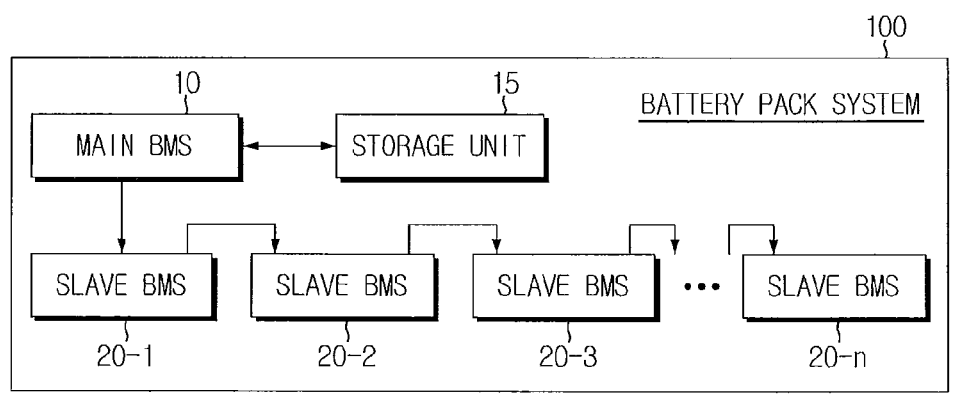
FIG. 2 is a diagram illustrating a trigger signal architecture for setting or checking identification (ID) of a slave battery management system (BMS) according to an embodiment of the present invention.

FIG. 2 is a diagram illustrating a trigger signal architecture for setting or checking IDs of the slave BMSs 20 according to an embodiment of the present invention.

As shown in FIG. 2, a trigger signal used to initialize ID setting has a serial architecture starting from the main BMS 10 ending with an Nth slave BMS 20-*n* via a first slave BMS 20-1, a second slave BMS 20-2, and the like, in a sequential manner.

Figure 3:
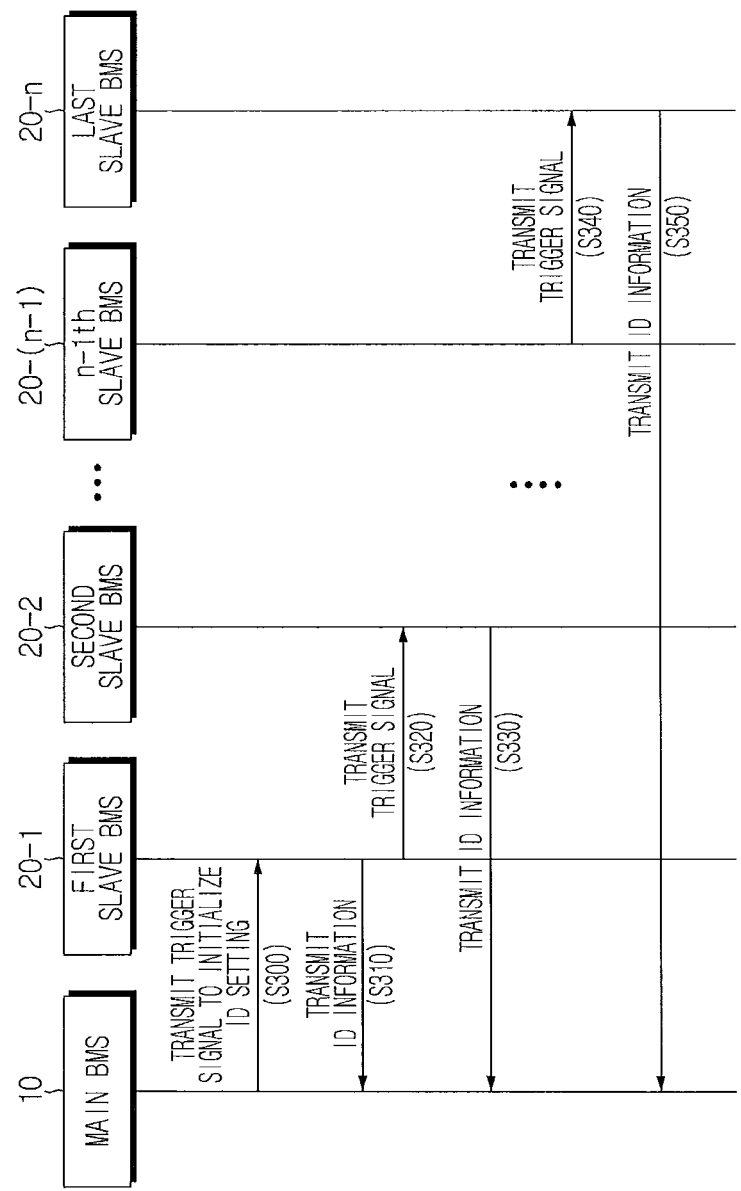
FIG. 3 is a signal flow chart illustrating a serial signal architecture for setting sequential IDs to slave BMSs according to an embodiment of the present invention.

FIG. 3 is a signal flow chart illustrating a serial signal architecture for setting sequential IDs to the slave BMSs 20 according to an embodiment of the present invention.

Referring to FIG. 3, when IDs are to be set initially or to be inspected or checked when needed or in a periodical interval, the main BMS 10 of the present invention transmits a trigger signal to the first slave BMS 20-1 to initialize an ID setting process (S300). In this instance, the slave BMSs other than the first slave BMS 20-1 are in a stand-by state.

When the first slave BMS 20-1 receives the trigger signal, the first slave BMS 20-1 transmits ID information of the first slave BMS 20-1 to the main BMS 10 (S310) and the trigger signal to the second slave BMS 20-2 (S320).

When the second slave BMS 20-2 receives the trigger signal from the first slave BMS 20-1, the second slave BMS 20-2 transmits ID information of the second slave BMS 20-2 to the main BMS 10 (S330) and the trigger signal to the third slave BMS 20-3. This process continues in a sequential manner until the last Nth slave BMS 20-*n* transmits ID information of the Nth slave BMS 20-*n* to the main BMS 10.

That is, the N-1 th slave BMS 20-(n-1) transmits ID information of the N-1 th slave BMS 20-(n-1) to the main BMS 10 and the trigger signal to the last Nth slave BMS 20-*n* (S340), and then the Nth slave BMS 20-*n* transmits ID information of the Nth slave BMS 20-*n* to the main BMS 10 (S350). In this way, a procedure of an ID setting or checking cycle is completed.

Accordingly, the present invention transmits a trigger signal in serial to the slave BMSs 20 having sequential physical locations, thereby accurately setting or checking the IDs of the slave BMSs 20 and preventing the problems caused by ID overlap.

Figure 4:
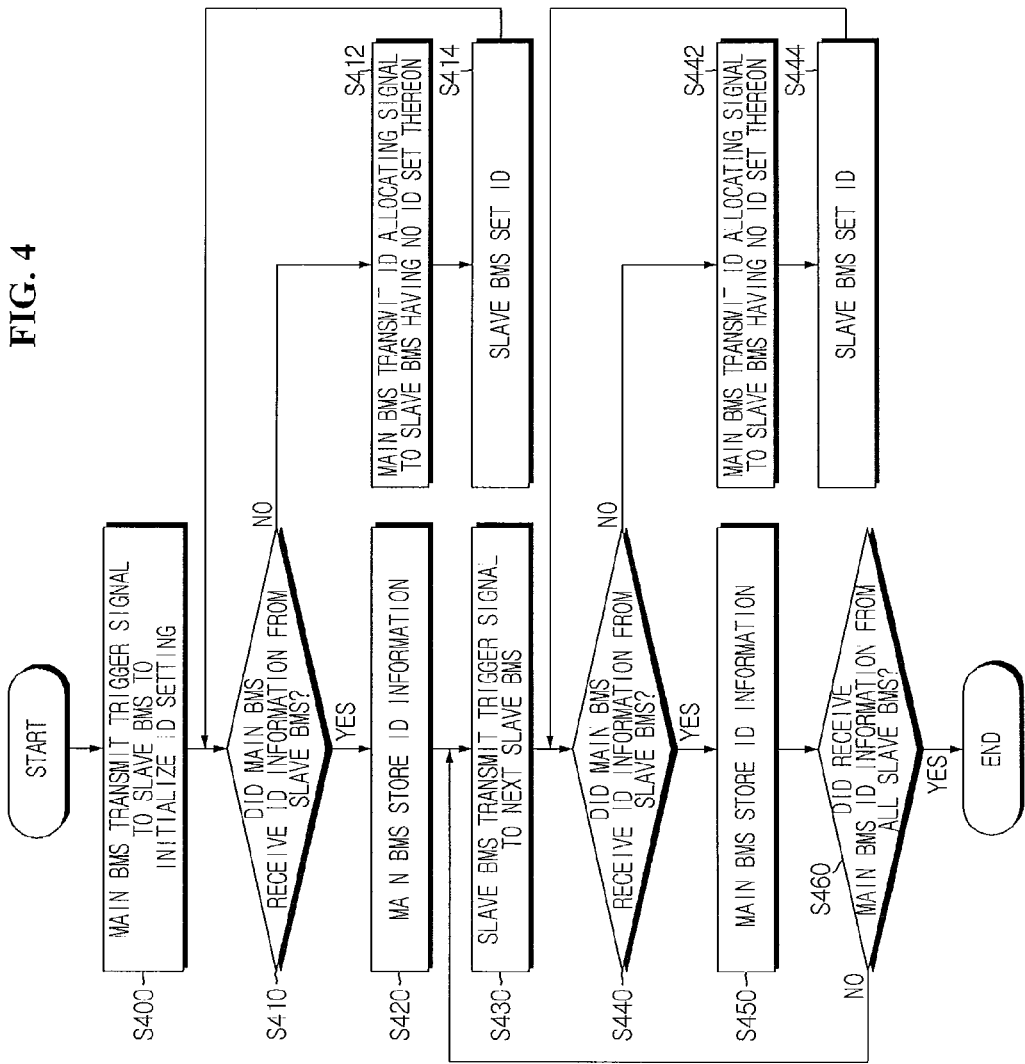
FIG. 4 is a flow chart illustrating a process for setting sequential IDs to slave BMSs having no IDs set thereon according to an embodiment of the present invention.

Hereinafter, a process for setting sequential IDs to slave BMSs having no IDs set thereon according to an embodiment of the present invention is described in more detail with reference to FIG. 4.

Like the process of FIG. 3, the main BMS 10 transmits a trigger signal to the first slave BMS 20-1 to initialize ID setting (S400).

When the main BMS 10 receives ID information of the first slave BMS 20-1 from the first slave BMS 20-1 within a predetermined time (S410), the main BMS 10 stores the received ID information in a storage unit 15 (S420) and controls the first slave BMS 20-1 to transmit the trigger signal to a next slave BMS (S430).

On the contrary, when the main BMS 10 does not receive ID information of the first slave BMS 20-1 from the first slave BMS 20-1 within a predetermined time, the main BMS 10 determines that the first slave BMS 20-1 has no ID set thereon and transmits an ID allocating signal to the first slave BMS 20-1 to give new ID information to the first slave BMS 20-1 (S412).

After the first slave BMS 20-1 receives the ID allocating signal, the first slave BMS 20-1 sets an ID of the first slave BMS 20-1 in response to the signal and transmits ID information of the first slave BMS 20-1 to the main BMS 10 (S414).

After the main BMS 10 receives the ID information of the first slave BMS 20-1 from the first slave BMS 20-1 (S440), the main BMS 10 stores the received ID information in the storage unit 15 (S450). This process continues until the main BMS 10 receives ID information of the last Nth slave BMS 20-*n* from the Nth slave BMS 20-*n* (S460).

In step S440, when the main BMS 10 does not receive ID information of a specific slave BMS 20 within a predetermined time, the main BMS 10 transmits an ID allocating signal to the corresponding slave BMS 20 having no ID set thereon to give new ID information to the slave BMS 20 (S442).

When the slave BMS 20 receives the ID allocating signal, the slave BMS 20 sets an ID of the slave BMS 20 in response to the signal and transmits ID information of the slave BMS 20 to the main BMS 10 (S444).

In this instance, IDs are independent for distinguishing the slave BMSs 20 from each other, however to perform a correct ID setting and improve the operational convenience of an operator, IDs preferably comply with the sequential location structure of slave BMSs having sequential physical locations.

Hereinafter, a process for setting a new ID to a slave BMS having no ID set thereon is described in more detail with reference to FIG. 5.

Figures 5, 6:
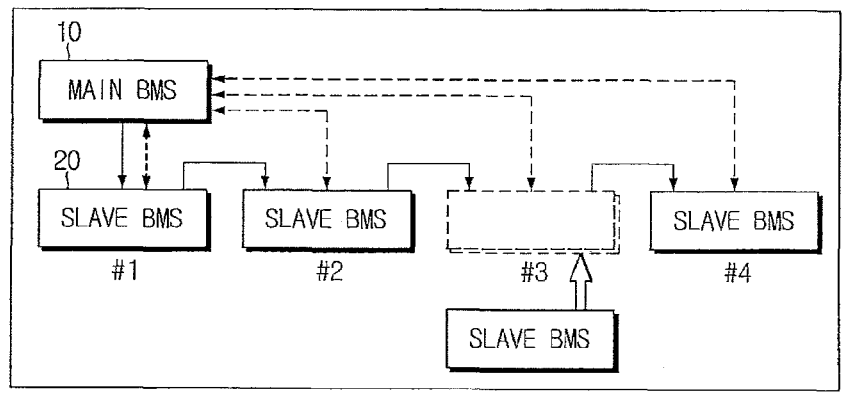
FIG. 5 is a diagram illustrating a process for setting an ID to a new slave BMS according to an embodiment of the present invention.
FIG. 6 is an ID information table for resetting an ID of a slave BMS according to an embodiment of the present invention.

Referring to FIG. 5, the main BMS 10 is interconnected to four slave BMSs 20 having sequential physical locations.

Assume that a malfunction or error occurs to #3 slave BMS 20 and #3 slave BMS 20 is to be replaced by a new slave BMS 20 having no ID set thereon. According to the above process, #1 slave BMS 20 transmits ID information [0001] (binary number) of #1 slave BMS 20 to the main BMS 10 and a trigger signal to #2 slave BMS 20. #2 slave BMS 20 transmits ID information [0010] of #2 slave BMS 20 to the main BMS 10 and the trigger signal to #3 slave BMS 20.

Since #3 slave BMS 20 does not have an ID set thereon, #3 slave BMS 20 cannot transmit ID information of #3 slave BMS 20 to the main BMS 10. When the main BMS 10 does not receive ID information of #3 slave BMS 20 from #3 slave BMS 20 within a predetermined time, the main BMS 10 determines #3 slave BMS 20 as a new slave BMS.

The main BMS 10 transmits an ID allocating signal including ID information [0030] to #3 slave BMS 20. When #3 slave BMS 20 receives the ID allocating signal, #3 slave BMS 20 sets an ID of #3 slave BMS 20 using the ID information [0030] included in the ID allocating signal in a programmed way. Also, #3 slave BMS 20 checks and transmits the ID information to the main BMS 10. This process ends with #4 slave BMS 20.

In this instance, the ID allocating signal may have various frame structures and a command to set an ID of a slave BMS using new ID information included in the ID allocating signal may be contained in a certain frame.

Hereinafter, an ID information table for resetting an ID of a slave BMS having an ineffective ID information is described in more detail with reference to FIG. 6.

Referring to FIG. 6, since the main BMS 10 receives ID information of each slave BMS 20 from the entire slave BMS 20 over which the main BMS 10 controls according to the above process, the main BMS 10 determines whether or not there is a slave BMS 20 having an ID deviating from the sequential ID structure of the entire slave BMS 20.

As shown in FIG. 6, ID information of #1, #2, and #4 slave BMSs 20 is effective ID information corresponding to the sequential physical locations of the slave BMSs 20, but ID information of #3 slave BMS 20 is ineffective ID information deviating from the sequential ID structure.

Although this embodiment shows sequential IDs 10, 20, 30, and 40 corresponding to the physical locations of the slave BMSs 20, various ID examples may be implemented if they follow the sequential ID structure.

Since ID information of #3 slave BMS 20 transmitted to the main BMS 10 is not effective, the main BMS 10 transmits an ID resetting signal to #3 slave BMS 20. Here, ID information for resetting is ID information complying with the sequential ID structure of the entire slave BMS 20.

When #3 slave BMS 20 receives the ID resetting signal from the main BMS 10, #3 slave BMS 20 updates or resets the ID information of #3 slave BMS 20 in response to the ID resetting signal. Also, #3 slave BMS 20 checks and transmits the updated or reset ID information to the main BMS 10 to enable the main BMS 10 collect and store data.

Preferably, to more effectively apply the present invention to a multi-slave BMS including a plurality of slave BMSs having sequential physical locations, the main BMS 10 determines, as ineffective ID information, at least one of the cases where ID information transmitted from a slave BMS overlaps with ID information of the other slave BMSs, where the number of ID information is not equal to the total number of the slave BMSs, and where ID information transmitted from a slave BMS does not correspond to the physical location of the slave BMS or is non-sequential. Then the main BMS 10 transmits an ID resetting signal to the corresponding slave BMS to control the slave BMS to update or reset the ID information of the slave BMS.

According to embodiments of the present invention, when a slave BMS having no ID set thereon receives a trigger signal, the slave BMS may search for an ID not allocated to the other slave BMSs by monitoring or inspecting the network traffic of the other slave BMSs in response to the trigger signal, and set the found ID as an ID of the slave BMS using the search results, and transmit ID information of the slave BMS to the main BMS.

According to embodiments of the present invention, the main BMS may detect whether or not there is ID information deviating from the sequential location structure of a plurality of the slave BMSs in the battery pack using stored ID information of the slave BMSs, and control a corresponding slave BMS to set or reset ID information of the slave BMS.

According to teachings above, the method for setting sequential ID to a multi-slave battery pack according to the present invention may eliminate the need to individually set an ID to a battery pack or slave BMSs, thereby reducing the process time and production costs, consequently improving the productivity. Also, it is possible to manufacture a battery pack from an assembly of slave BMSs having the same condition, resulting in a simple production line.

When a certain slave BMS is replaced by a new one or an additional slave BMS having an ID set thereon is mounted, an ID is set or reset based on the sequential physical location of the corresponding slave BMS within a battery pack in accordance with a serial architecture of a trigger signal, thereby preventing ID overlapping or non-sequential ID setting, and as a result, considerably enhancing the adaptability to various environments such as system expansion or initial installation and improving the reliability of products.

The advantages and features of the present invention may eliminate the need for an operator to individually check IDs of slave BMSs when replacing a certain slave BMS by a new one, thereby improving the operational efficiency and minimizing or preventing a system error caused by erroneous mounting.

Particularly, the present invention can efficiently control and manage BMSs for a battery pack including a plurality of batteries connected in series or parallel that was developed for efficient energy use with the steady exhaustion of energy.

It should be understood that the components or elements of the battery pack of the present invention shown in the drawings may not be physically but rather logically distinguished therebetween.

In other words, it should be interpreted that since each component or element of the battery pack according to the present invention is a logic component or element, they fall within the spirit or scope of the invention if they perform a function of a logic feature of the present invention whether they operate separately or integratedly, and even though they are named otherwise, they fall within the spirit or scope of the invention if they perform the same or similar function.

What is claimed is:

1. A method for setting sequential identification (ID) to a multi-slave battery management system (BMS) in a battery pack, the battery pack including N, wherein N is greater than or equal to 2, slave BMSs having sequential physical locations to control a battery module containing at least one battery and a main BMS to control the N slave BMSs, the method comprising:
   an initiation step of the main BMS transmitting a trigger signal, which is an initiation signal for ID setting, to a first slave BMS among the N slave BMSs;
   a transmission step of the first slave BMS receiving the trigger signal and transmitting ID information of the first slave BMS to the main BMS and the trigger signal to a next slave BMS;
   a follow-up step of sequentially performing a process of receiving the trigger signal and transmitting slave BMS ID information to the main BMS and the trigger signal to a next slave BMS throughout the second slave BMS to the N-1th slave BMS;
   a termination step of the Nth slave BMS receiving the trigger signal and transmitting ID information of the Nth slave BMS to the main BMS;
   a new ID transmission step of, when ID information is not transmitted from a slave BMS within a predetermined time, the main BMS transmitting an ID allocating signal including ID information to the slave BMS having not transmitted ID information, that is, an unset slave BMS, to allocate new ID information; and a first setting step of the unset slave BMS setting ID information of the slave BMS in response to the ID allocating signal and transmitting the set ID information of the slave BMS to the main BMS.

2. The method according to claim 1, wherein the new ID information is information corresponding to the physical location of the unset slave BMS in relation to the N slave BMSs.

3. The method according to claim 1, further comprising:

a resetting signal transmission step of, when ID information transmitted from a slave BMS is ineffective, the main BMS transmitting an ID resetting signal to the slave BMS having transmitted the ineffective ID information, that is, a non-matching slave BMS, to give reset ID information; and an updating step of the non-matching slave BMS updating the ID information of the slave BMS in response to the ID resetting signal.

4. The method according to claim 3, further comprising:

a re-transmission step of the slave BMS having updated the ID information of the slave BMS transmitting the updated ID information to the main BMS.

5. The method according to claim 3, wherein a case where ID information transmitted from a slave BMS is ineffective is at least one of the cases where ID information transmitted from a slave BMS overlaps with ID information-transmitted from other slave BMS, where the number of ID information is not equal to the total number of the slave BMSs, and where ID information transmitted from a slave BMS does not correspond to a physical location of the slave BMS or is non-sequential.

6. The method according to claim 3, wherein the reset ID information is information corresponding to the physical location of the non-matching slave BMS in relation to the N slave BMSs.

7. The method according to claim 1, further comprising:

a second setting step of, when a slave BMS having received the trigger signal has no set ID information, the slave BMS searching ID information set to the other slave BMSs, setting ID information not allocated to the other slave BMSs as ID information of the slave BMS using result information of the search, and transmitting the set ID information of the slave BMS to the main BMS.

8. A system for setting sequential identification (ID) to a multi-slave battery management system (BMS) in a battery pack, the battery pack including N, wherein N is greater than or equal to 2, slave BMSs having sequential physical locations to control a battery module containing at least one battery and a main BMS to control the N slave BMSs, the system comprising:

a main BMS to transmit a trigger signal, which is an initiation signal for ID setting, to a first slave BMS among the N slave BMSs;

a first slave BMS to receive the trigger signal from the main BMS and transmit ID information of the first slave BMS to the main BMS and the trigger signal to a next slave BMS;

a slave BMS to receive the trigger signal and sequentially performing the transmission of ID information of the slave BMS to the main BMS and the trigger signal to a next slave BMS; and an Nth slave BMS to receive the trigger signal and transmit ID information of the Nth slave BMS to the main BMS, wherein, when ID information is not transmitted from a slave BMS within a predetermined time, the main BMS transmits an ID allocating signal including ID information to the slave BMS having not transmitted ID information, that is, an unset slave BMS, to allocate new ID information, and the unset slave BMS sets ID information of the slave BMS in response to the ID allocating signal and transmits the set ID information of the slave BMS to the main BMS.

9. The system according to claim 8, wherein the new ID information is information corresponding to the physical location of the unset slave BMS-in relation to the N slave BMSs.

10. The system according to claim 8, wherein, when ID information transmitted from a slave BMS is ineffective, the main BMS transmits an ID resetting signal to the slave BMS having transmitted the ineffective ID information, that is, a non-matching slave BMS, to give reset ID information; and the non-matching slave BMS updates the ID information of the slave BMS in response to the ID resetting signal.

11. The system according to claim 10, wherein the slave BMS having updated the ID information of the slave BMS transmits the updated ID information to the main BMS.

12. The system according to claim 10, wherein a case where ID information transmitted from a slave BMS is ineffective is at least one of the cases where ID information transmitted from a slave BMS overlaps with ID information transmitted from other slave BMS, where the number of ID information is not equal to the total number of the slave BMSs, and where ID information transmitted from a slave BMS does not correspond to a physical location of the slave BMS or is non-sequential.

13. The system according to claim 10, wherein the reset ID information is information corresponding to the physical location of the non-matching slave BMS in relation to the N slave BMSs.

14. The system according to claim 8, wherein when a slave BMS having received the trigger signal has no set ID information, the slave BMS searches ID information set to the other slave BMSs, sets ID information not allocated to the other slave BMSs as ID information of the slave BMS using result information of the search, and transmits the set ID information of the slave BMS to the main BMS.

15. A battery pack comprising the system for setting sequential ID to the multi-slave BMS in the battery pack defined in claim 8.

* * * * *